TRANSMISSION OF ANALOG SIGNALS BY SAMPLING AT AMPLITUDE EXTREMES AND SYNCHRONIZING SAMPLES TO A CLOCK

Filed July 2, 1964 3 Sheets-Sheet 1

INVENTOR,
ADOLPH REINDL.
BY: Harry M. Saragovitz, Edward J. Kelly, Herbert Berl & Julian C. Keppler
ATTORNEYS.

INVENTOR,
ADOLPH REINDL.
BY Henry M. Saragovitz, Edward J. Kelly, Herbert Berl & Julian C. Keppler
ATTORNEYS.

INVENTOR,
ADOLPH REINDL.
BY: Harry M. Saragovitz,
Edward J. Kelly,
Herbert Berl &
Julian C. Keppler
ATTORNEYS.

United States Patent Office 3,369,182

Patented Feb. 13, 1968

3,369,182
TRANSMISSION OF ANALOG SIGNALS BY SAMPLING AT AMPLITUDE EXTREMES AND SYNCHRONIZING SAMPLES TO A CLOCK

Adolf Reindl, Long Branch, N.J., assignor to the United States of America as represented by the Secretary of the Army Filed July 2, 1964, Ser. No. 380,107
4 Claims. (Cl. 325—44)

ABSTRACT OF THE DISCLOSURE

The apparatus includes a means for sampling the amplitudes of the extreme points of an analog signal. These extreme point amplitudes are then temporarily stored and transmitted in synchronism with the next succeeding pulse emitted by a clock. At the receiver, the signal path is periodically opened by means of a clock synchronized with the clock of the transmitter, thus reducing received noise while transmitting a given analog signal at a reduced average sampling rate.

The invention described herein may be manufactured and used by or for the Government for governmental purposes, without the payment of any royalty thereon.

This invention relates to the transmission of continuously variable signals of the analog type by pulse sampling techniques. It is well known that an analog signal such as a speech signal need not be transmitted in its entirety, but may be periodically sampled to yield the instantaneous amplitude at a number of spaced points in time. If the sampling rate is at least twice as high as the highest frequency component of the analog signal, the original analog signal can be reconstructed at the receiver utilizing the instantaneous amplitude samples. Periodic sampling lends itself to time division multiplexing wherein a number of analog signals are periodically sampled at slightly different times or phases and the samples interleaved in time on a common transmission path. Also, with periodic sampling, the occurrence of the samples is known and predictable and the receiver signal path need only be open for the short period in which the sample must fall, thus reducing the received noise. In order to reduce the average sampling rate below the so-called Nyquist rate of twice the highest frequency component, it has been proposed in the past to vary the sampling rate depending on the instantaneous frequency content of the analog signal. This can be accomplished, for example, by controlling the sampling frequency generator or clock with the outputs of a bank of bandpass filters to which the analog signal is applied. Another method is to sample the analog signal only at its extreme points, that is, at each maximum and minimum point, since the instantaneous frequency is directly related to the number of maxima and minima per unit time. At the receiver, the original wave can be reconstructed by interpolation between the transmitted extreme points. A disadvantage of variable rate sampling is that the signal path of the receiver must be open constantly since the occurrence of the samples is not predictable, with consequent increased receiver noise. Also, time division multiplexing of several signals is impossible because of the random occurrence of the samples.

The present invention comprises a method and means for transmitting analog signals at a reduced average sampling rate while retaining most of the advantages of prior art systems which sample at the fixed Nyquist rate. Briefly stated, the invention comprises the sampling of the analog signal at its extreme points, temporarily storing the amplitude or value of each sample so obtained and transmitting each sample in synchronism with the next succeeding pulse emitted by a clock of constant frequency, said constant frequency being at least equal to twice the highest frequency component of the analog signal.

Figures 1, 4:
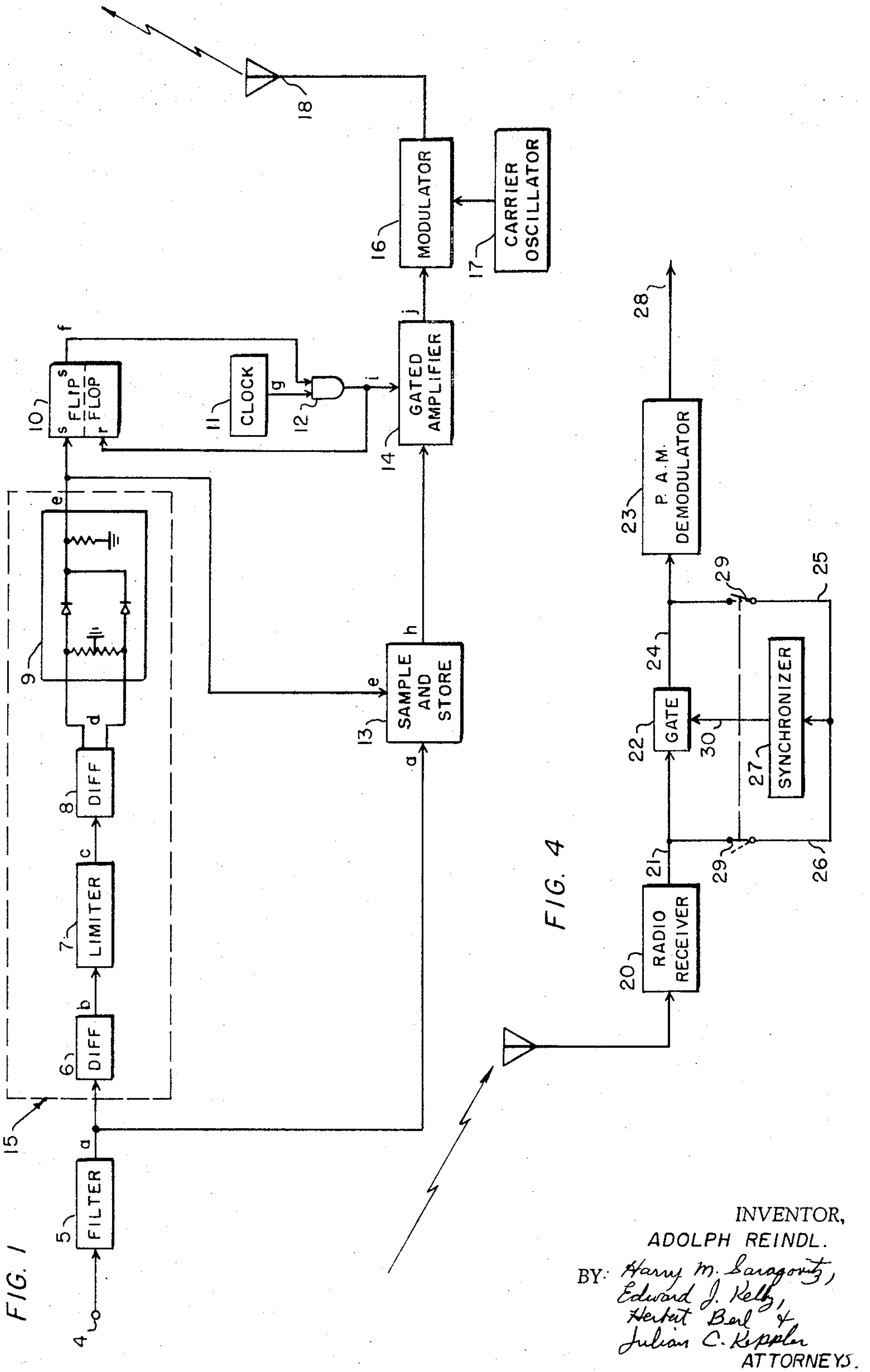
Figure 2:
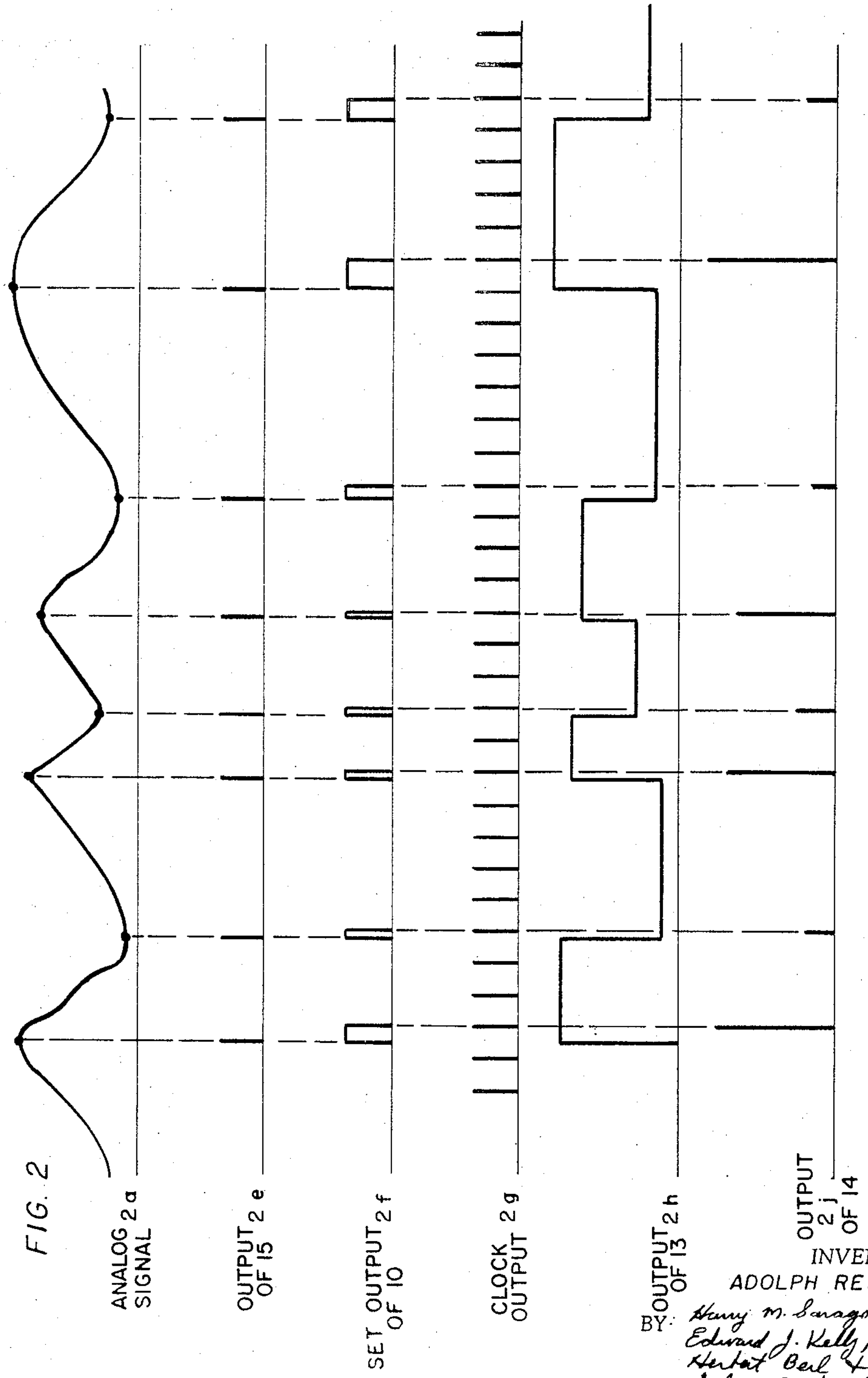
Figure 3:
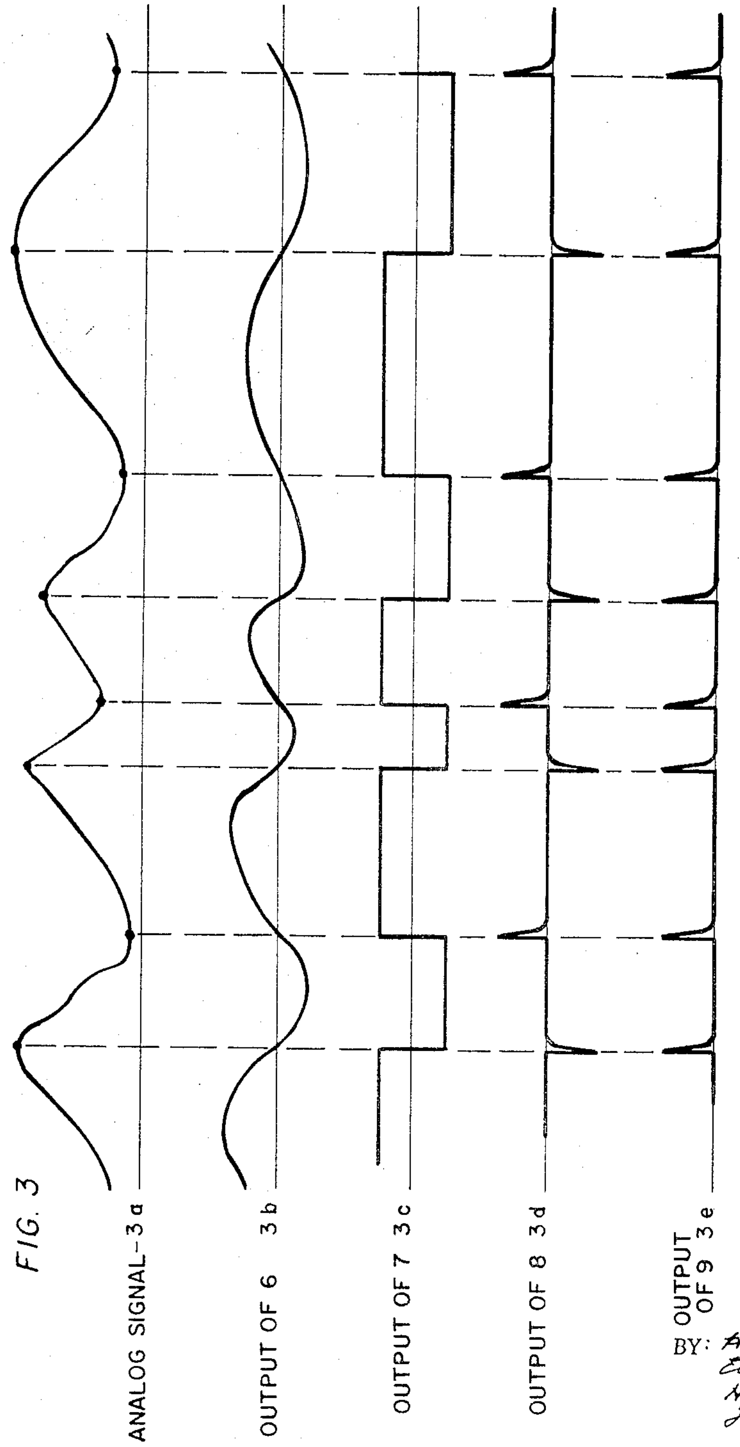

The invention will be better understood in connection with the following detailed description and drawings, in which:

FIG. 1 is a block diagram of a transmitter embodying the principles of the invention and FIGS. 2 and 3 are waveforms in various parts of the circuit. FIG. 4 is a block diagram of a receiver which may be used in conjunction with the transmitter of FIG. 1. In FIG. 1 the analog signal to be transmitted is applied to filter 5 which eliminates noise signals outside of the spectrum of the input analog signal. The output of filter 5 is applied via lead *a* to the input of extreme point detector 15 and to the signal input of sample and store circuit 13. The extreme point detector 15, shown in dashed outline, includes a differentiator 6, a limiter 7, a second differentiator 8 and a full wave rectifier 9 connected in cascade in the order named. The output of extreme point detector 15 is applied to the set input of bistable flip-flop 10 via lead *e* and also to the control input of sample and store circuit 13. Clock pulse generator 11 has its output connected to one input of AND gate 12 via lead *g*. The other input of AND gate 12 is the set output of flip-flop 10, lead *f*. The output *i* of AND gate 12 is applied to gated amplifier 14 to provide a gating signal therefor. The output of the gated amplifier at *j* is a pulse amplitude modulated (PAM) signal having an envelope substantially the same as the original analog signal. The line *j* is applied to a radio transmitter comprising modulator 10, carrier oscillator 17 and antenna 18. Also, the PAM pulse train at *j* may be converted to pulse position or pulse code modulation before transmission. In this case an appropriate modulation converter would be inserted between the gated amplifier 14 and the modulator 16.

The operation of the device is as follows: The input analog signal, shown at FIG. 2*a*, is applied to extreme point detector 15 and to the signal input of sample and store circuit 13. The extreme point detector generates a pulse or spike at its output *e* for each extreme point in the analog input. These extreme points are the maxima and minima of the analog waveform. Each such point is indicated by a dot on the waveform 2*a*. FIG. 2*e* shows the pulse output of 15. A detailed description of the operation of the extreme point detector will be given below in connection with FIG. 3. Each pulse on lead *e* triggers the sample and store circuit 13. Upon triggering, circuit 13 samples the instantaneous amplitude of the analog waveform at each extreme point and holds this amplitude value in a storage device such as a capacitor until the following extreme point occurs. The resultant output at lead *h* of 13 is shown at FIG. 2*h*. The output *e* of the extreme point detector also simultaneously sets the flip-flop 10, thereby raising the voltage on its set output at lead *f*. The set output 10 is shown in FIG. 2*f*. The output of the clock pulse generator 11 is shown at 2*g*. During the first two clock pulses of 2*g*, the flip-flop 10 is reset and no voltage is present at its set output; therefore AND gate 12 will not pass these first two clock pulses to the gated amplifier 14. The third clock pulse however will pass through gate 12 and provide a gating signal at *i* for gated amplifier 14. The gating of 14 opens a transmission path therethrough and momentarily applies the output *h* of the sample and store circuit 13 to the lead *j*. The output *i* of gate 12 is also fed to the reset input of flip-flop 10, which remains reset until the following extreme point occurs. The signal at lead *j* is shown at FIG. 2*j*. Thus it can be seen that the circuitry samples the value of each extreme point and in effect "time quantizes" these samples by transmitting them in synchronism with the next succeeding clock pulse. The flip-flop 10, AND gate 12 and gated amplifier 14 together comprise a means for accomplishing this time quantizing. The time quantized amplitude samples then modulate the output of the carrier from 17 to form radio frequency pulses corresponding to the PAM signal at FIG. 2*j*.

It can be seen that the instantaneous sampling rate will be determined by the instantaneous frequency content of the analog signal. For instance, the central portion of the waveform 2*a* contains higher frequency components than either of the end portions and hence the instantaneous sampling rate is higher for the central portion. Speech signals vary widely in frequency content depending on the type of sound uttered, the general tone of the speaker's voice and other factors. For example, the consonants generally contain higher frequency components than vowels. Also, between words and while the other party is talking, obviously no frequency components are present. In order to provide good intelligibility, it is necessary to transmit speech frequencies up to about 4000 c.p.s.; however, for the reasons stated above, a typical speech signal may contain components above 2000 c.p.s. only 50% of the time or less. Therefore, the sampling of such a signal at the fixed Nyquist rate of 8000 c.p.s. results in redundancy or oversampling 50% of the time. By making the sampling rate dependent on the frequency content of the signal, this oversampling is avoided and the average sampling rate can be made much less than 8000 c.p.s. for speech signals. In the circuitry of FIG. 1, the frequency of the clock 11 should be at least twice that of the highest frequency component of the analog signal to be transmitted. This follows from the fact that a sinusoidal signal must be sampled at least twice during every cycle if it is to be reconstructed at the receiver. Thus the maximum sampling rate will be equal to the Nyquist rate; however, as was stated above, this maximum rate will be necessary only for a small percentage of the time. Due to the fact that the maximum sampling rate is equal to the Nyquist rate, the bandwidth required for transmission will be the same as that for conventional fixed rate sampling system; however the total number of samples required to be transmitted for a given signal will be greatly reduced with the instant invention.

As can be seen from FIG. 2, the positions of the PAM samples of FIG. 2*j* do not precisely correspond in time to the maxima and minima of the original analog waveform, due to the fact that the extreme point amplitudes must be temporarily stored until the next clock pulse appears. This fact gives rise to a distortion of the reproduced analog signal at the receiver which may be termed "time quantizing noise," since it results from displacing the extreme points to discrete time quanta determined by the clock output. This time quantizing noise or error is analogous to the quantizing noise found in systems wherein a continuously variable signal is broken up into discrete amplitude quanta. The time quantizing error of the instant invention can be reduced by increasing the frequency of clock 11 relative to the highest frequency component of the analog signal. As was stated above, the minimum clock frequency is equal to the Nyquist rate; however, if the clock frequency is made higher than the Nyquist rate, for example, three or four times the highest frequency component of the analog signal, the time quantizing noise or error will be reduced since the average time of storage before transmission of the extreme points in sample and store circuit 13 will be reduced. It should be noted that increasing the clock frequency above the Nyquist rate will not result in a higher bandwidth since the maximum instantaneous sampling rate is determined by the analog signal and not by the clock frequency.

The operation of the extreme point detector 15 can be understood with reference to the waveforms of FIG. 3. FIG. 3*a* is the analog signal at the input of the detector on lead *a*. After passing through the differentiator 6, the extreme points are converted to zero points, since the rate of change of voltage at each extreme is zero. The output of differentiator 6 on lead *b* is shown at 3*b*. The signal is then applied to limiter 7 which converts it to a square wave having zero crossings corresponding to the extreme points of the original analog signal, as shown at 3*c*. The output of 7 is applied to a second differentiator 8 which generates a negative spike for each negative-going zero crossing of waveform 3*c* and a positive spike for each positive-going zero crossing therein, as illustrated at 3*d*. Differentiator 8 is provided with a balanced or push-pull output on leads *d* which are applied to the full wave rectifier 9. The rectifier inverts the negative spikes of the waveform 3*d* to form the waveform 3*e* which includes a positive spike or pulse at each extreme point of the original signal 3*a*. The extreme point detector 15 may take other forms, for instance that shown in U.S. Patent 2,448,718 issued on September 7, 1948 to M. Koulicovitch.

At the receiving end of the system, a gate in the signal path can be arranged to be opened periodically in synchronism with clock 11 of the transmitter, thereby blocking the entrance of noise outside of the narrow time slots during which the samples are transmitted. A simplified diagram of such a receiver is shown in FIG. 4. The received radio frequency pulses are amplified and detected by radio receiver 20, the output of which on lead 21 will correspond to the PAM pulse train at lead *j* of the transmitter. The PAM signal on lead 21 is applied to the input of gate 22 and to the input of synchronizing circuit 27 via switch 29 and lead 26. The output of gate 22 is connected to PAM demodulator 23 via lead 24 and also to the input of synchronizing circuit 27 via another ganged pole of double pole switch 29 and lead 25. The output of synchronizing circuit 27 is applied to gate 22 via lead 30 to provide a gate opening signal therefor. The synchronizing circuit 27 comprises an oscillator for example, a multivibrator, which has a free running frequency approximately equal to that of the transmitter clock. The synchronizing circuit must be locked in phase with the transmitter clock before each message transmission. This can be accomplished by known means, for example, prior to each transmission the transmitter clock 11 may be applied to lead *j* to transmit a synchronizing signal. During this period the double pole switch 29 will be in the position shown and the received clock pulses will be applied to the synchronizing circuit via lead 26 thereby locking the oscillator in phase with the clock. As soon as the oscillator in circuit 27 becomes locked in phase, the clock pulses will appear at the output of gate 22 on lead 24. The double pole switch 29 is then switched to its alternate position shown in dashed lines in FIG. 4, thus breaking the connection of lead 21 to the synchronizing input of 27 and making a connection between lead 24 and the synchronizing input of 27. Thereafter the clock pulses will be applied to the synchronizing oscillator via lead 25. The clock will then be removed from the lead *j* of the transmitter and the message sent. The PAM signal on lead 24 will thereafter maintain synchronism by virtue of its connection to the oscillator within circuit 27 via lead 25. The PAM signal at lead 24 will have an irregular repetition rate or frequency, but all of the pulses therein will correspond in time to one of the clock pulses, therefore the synchronizing circuit will remain locked in phase with the transmitter clock. The gated PAM signal is then applied to the PAM demodulator 23 which reconstructs the original analog signal from the transmitted extreme points by known methods, as illustrated for example in U.S. Patent 3,023,277, issued to M. V. Mathews on February 27, 1962. The reconstructed analog signal appears at lead 28.

In the above-described radiotelephone system, the reduced average sampling rate reduces the possibility of interference and crosstalk wherein a large number of stations may be located in the same general area and where several transmitters may share the same carrier frequency. In this event, all the transmitters on the same carrier frequency would have different clock frequencies not multiples of each other and the receivers may be tuned to a desired transmitter by adjusting the free running frequency of the synchronizing circuit 27 to equal that of the clock of the desired transmitter. Also, the instant method of reducing the average sampling rate can be applied advantageously to pulse type radiotelephone systems in which each pair of communicating stations employs a unique time code, that is, where each amplitude sample is transmitted more than once with a unique time spacing between the pulses representing the same amplitude. The receivers can then distinguish a desired transmission by means of the unique time spacing between the transmitted pulses. For larger numbers of stations a combination of time and frequency coding may be utilized.

While the invention has been described in connection with a preferred embodiment thereof, it is obvious that many changes may be made therein without departing from the inventive concepts herein disclosed, accordingly the invention should be limited only by the scope of the appended claims.

What is claimed is:

1. Apparatus for transmitting samples of a continuously variable analog signal at a reduced average sampling rate comprising, an extreme point detector for producing a pulse at each minimum and maximum of said analog signal, a sample and store circuit for sampling and storing instantaneous amplitudes of said analog signal, means to apply said analog signal to the input of said extreme point detector and to the signal input of said sample and store circuit, a flip-flop circuit, the output of said extreme point detector being connected to the set input of said flip-flop and also to the control input of said sample and store circuit, a clock pulse generator, an AND gate and a gated amplifier, the output of said clock pulse generator forming one input of said AND gate, the other input thereof being the set output of said flip-flop, the output of said AND gate being connected to the gate input terminal of said gated amplifier and also to the reset input of said flip-flop, the output of said sample and store circuit being connected to the signal input terminal of said gated amplifier, the signal output of said gated amplifier forming an output line on which appears the extreme point samples of said analog wave time quantized in synchronism with the output of said clock pulse generator, the frequency of said clock pulse generator being at least twice that of the highest frequency component in said analog signal.

2. Apparatus for transmitting samples of a speech signal at a reduced average sampling rate comprising, an extreme point detector for producing a pulse at each minimum and maximum of said speech signal, means to apply said speech signal to the input of said extreme point detector, means controlled by the output of said extreme point detector to sample and store the amplitude of each extreme point of said speech wave, means to set a flip-flop circuit in response to each pulse from the output of said extreme point detector, a generator of clock pulses, means to apply said clock pulses to one input of an AND gate, the other input thereof being the set output of said flip-flop, and means responsive to an output from said AND gate to reset said flip-flop and to gate the stored amplitude of each said extreme point to an output line, thereby producing a pulse amplitude modulated wave having an envelope substantially equal to said speech signal.

3. A system for transmitting analog signals comprising, a transmitter, said transmitter including means to detect each extreme point in said analog signal, means to sample and store the amplitude of each such extreme point, a source of clock pulses having a frequency more than twice that of the highest frequency component of said analog signal and means to transmit to a remote receiver the stored amplitude of each such extreme point in synchronism with the clock pulse next succeeding each such extreme point, said receiver comprising a gate circuit in the signal path thereof and means to periodically open said gate circuit in synchronism with said source of clock pulses, said receiver further comprising a pulse amplitude modulation demodulator.

4. A radiotelephone system comprising, a transmitter, said transmitter including a speech signal to be transmitted to a remote point, means to sample each extreme point in said speech signal, a source of clock pulses having a frequency more than twice that of the highest frequency component of said speech signal and means to transmit to a remote receiver the amplitude of each sampled extreme point in synchronism with the clock pulse next succeeding each extreme point, said receiver comprising a gate circuit in the signal path thereof and means to periodically open said gate circuit in synchronism with said source of clock pulse, said receiver further comprising a pulse amplitude modulation demodulator.

References Cited

UNITED STATES PATENTS

| | | | |
|---|---|---|---|
| 3,125,723 | 3/1964 | Spogen et al. | 325—38 |
| 3,189,834 | 6/1965 | Van't Slot et al. | 328—63 |
| 3,225,301 | 12/1965 | McCann | 328—63 |
| 3,299,204 | 1/1967 | Cherry et al. | 178—6 |

ROBERT L. GRIFFIN, *Primary Examiner.*

JOHN W. CALDWELL, *Examiner.*

J. T. STRATMAN, *Assistant Examiner.*